(12) United States Patent
Shieh et al.

(10) Patent No.: US 9,096,708 B2
(45) Date of Patent: Aug. 4, 2015

(54) PARTIALLY ESTERIFIED EPOXY RESIN AND EPOXY RESIN COMPOSITION APPLIED WITH THE SAME, AND METHOD FOR PREPARING THE COMPOSITION

(71) Applicant: INDUSTRIAL TECHNOLOGY RESEARCH INSTITUTE, Chutung, Hsinchu (TW)

(72) Inventors: Tien-Shou Shieh, Taipei (TW); Chih-Hsiang Ho, Hsinchu (TW); Pei-Ching Liu, Miaoli (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/764,362

(22) Filed: Feb. 11, 2013

(65) Prior Publication Data

US 2014/0113994 A1 Apr. 24, 2014

(30) Foreign Application Priority Data

Oct. 23, 2012 (TW) .............................. 101139100 A

(51) Int. Cl.
*C08L 63/00* (2006.01)
*C08L 63/02* (2006.01)
*C08G 59/14* (2006.01)
*C08G 59/16* (2006.01)
*C08K 3/22* (2006.01)
*C08K 3/34* (2006.01)
*C08K 3/36* (2006.01)

(52) U.S. Cl.
CPC ............ *C08G 59/1455* (2013.01); *C08G 59/14* (2013.01); *C08K 3/22* (2013.01); *C08K 3/346* (2013.01); *C08K 3/36* (2013.01); *C08L 63/00* (2013.01)

(58) Field of Classification Search
CPC ..... C08G 59/1455; C08G 63/44; C08G 63/58
USPC ................................................. 528/112, 365
See application file for complete search history.

(56) References Cited

U.S. PATENT DOCUMENTS

| | | |
|---|---|---|
| 2,890,210 A * | 6/1959 | Phillips et al. ................. 528/361 |
| 2,967,843 A * | 1/1961 | Delmonte et al. ............ 442/253 |
| 3,437,517 A | 4/1969 | Eilerman et al. |
| 3,657,196 A | 4/1972 | Foster |
| 3,686,045 A | 8/1972 | Foster |
| 3,852,245 A | 12/1974 | Gregornik et al. |
| 3,997,306 A | 12/1976 | Hedden |
| 4,049,597 A | 9/1977 | Motsinger |
| 4,076,765 A | 2/1978 | Nakahara et al. |
| 4,110,094 A | 8/1978 | Motsinger |
| 4,305,742 A | 12/1981 | Barch et al. |
| 4,647,605 A | 3/1987 | Ando et al. |
| 5,106,947 A | 4/1992 | Maurer et al. |
| 5,145,889 A | 9/1992 | Wada et al. |
| 5,198,479 A | 3/1993 | Shiobara et al. |
| 5,324,846 A | 6/1994 | Hirshman et al. |
| 6,180,696 B1 | 1/2001 | Wong et al. |
| 6,180,726 B1 | 1/2001 | Eklund et al. |
| 6,218,482 B1 | 4/2001 | Yamanaka et al. |
| 6,407,183 B1 | 6/2002 | Shimada et al. |
| 6,617,400 B2 | 9/2003 | Yeager et al. |
| 6,617,401 B2 | 9/2003 | Rubinsztajn |
| 6,667,078 B2 | 12/2003 | Shimada et al. |
| 6,809,162 B2 | 10/2004 | Rubinsztajn |
| 6,835,950 B2 | 12/2004 | Brown et al. |
| 2002/0042493 A1 * | 4/2002 | Hoyles et al. ................... 528/87 |
| 2012/0053302 A1 | 3/2012 | Li et al. |
| 2012/0199992 A1 | 8/2012 | Tabei |

FOREIGN PATENT DOCUMENTS

| | | |
|---|---|---|
| JP | 60065021 A | 4/1985 |
| JP | 61031424 A | 2/1986 |
| JP | 63132926 A | 6/1988 |
| JP | 10330456 A | 12/1998 |
| JP | 2000338605 A | 12/2000 |
| JP | 2005049691 A | 2/2005 |
| JP | 2005132659 A | 5/2005 |
| JP | 2005140264 | 6/2005 |
| JP | 2005279455 A | 10/2005 |
| JP | 2006234127 A | 9/2006 |

(Continued)

OTHER PUBLICATIONS

Akanksha Srivastava and J. S. P. Rai, Synthesis, characterization and curing behaviour of partial esters of cycloaliphatic epoxy resins *Designed Monomers and Polymers*, vol. 8, No. 4, pp. 319-334 (2005).

Yasumasa Morita, Cationic Polymerization of Hydrogenated Bisphenol-A Glycidyl Ether with Cycloaliphatic Epoxy Resin and Its Thermal Discoloration, Journal of Applied Polymer Science, vol. 97, pp. 1395-1400 (2005).

Yasumasa Morita, Hiroaki Sugino, Non-Catalytic Anhydride Curing of Hydrogenated Bisphenol-A Glycidyl Ether with 1,2,4-Cyclohexanetricarboxylic Anhydride and Light Emitting Diode Encapsulation, Journal of Applied Polymer Science, vol. 100, pp. 962-966 (2006).

*Primary Examiner* — Mark Kaucher
*Assistant Examiner* — Kregg Brooks
(74) *Attorney, Agent, or Firm* — Muncy, Geissler, Olds & Lowe, P.C.

(57) ABSTRACT

A partially esterified epoxy resin and an epoxy resin composition applied with the same, and a method for preparing the composition are provided. The preparation method includes the following steps. A bifunctional epoxy resin and an anhydride are mixed and heated, wherein the number of equivalent moles of the bifunctional epoxy resin is greater than that of the anhydride, to form a partially esterified epoxy resin. A curing agent is mixed into the partially esterified epoxy resin to form a mixed solution. The mixed solution is cured to form the partially esterified epoxy resin composition.

16 Claims, 1 Drawing Sheet

(56) References Cited

FOREIGN PATENT DOCUMENTS

| | | |
|---|---|---|
| JP | 2007207206 A | 8/2007 |
| JP | 2008053542 A | 3/2008 |
| JP | 2009059353 A | 3/2009 |
| TV | 201016813 | 5/2010 |
| TW | 514655 | 12/2002 |
| TW | I245583 | 12/2005 |
| TW | 200720313 | 6/2007 |
| TW | 200815385 | 4/2008 |
| TW | 200911870 | 3/2009 |
| TW | 201020291 A | 6/2010 |
| TW | 201022318 | 6/2010 |
| TW | 201026735 | 7/2010 |
| TW | 201120129 | 6/2011 |
| TW | 201139493 | 11/2011 |
| TW | 201211138 | 3/2012 |
| WO | WO-2007036194 A1 | 4/2007 |

\* cited by examiner

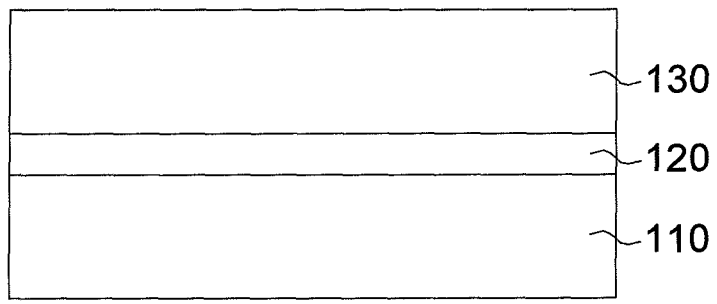

PARTIALLY ESTERIFIED EPOXY RESIN AND EPOXY RESIN COMPOSITION APPLIED WITH THE SAME, AND METHOD FOR PREPARING THE COMPOSITION

This application claims the benefit of Taiwan application Serial No. 101139100, filed Oct. 23, 2012, the disclosure of which is incorporated by reference herein in its entirety.

TECHNICAL FIELD

The disclosure relates to a partially esterified epoxy resin and a partially esterified epoxy resin composition applied with the same, and a method for preparing the partially esterified epoxy resin composition.

BACKGROUND

Conventionally, flat panel displays are manufactured based on glass substrate technology. However, due to the limitations of the mechanical characteristics of the present glass substrate technology, future public display application requirements will not be fulfilled. As such, new generations of display devices with flexible substrates have been developed for satisfying requirements, such as lightness and thinness of devices, devices being able to be hung up, and displaying texts and dynamic images according to different usage situations. In addition, smart portable devices of new generations require more functions, such as convenient portability and sturdiness of the devices. Accordingly, the development trend of displays also includes satisfying requirements of lightness and thinness of devices, rigidness and crashworthiness, and big panel sizes with good portability.

Among the manufacturing processes of a flexible display device, the packaging process is a very critical one, because light emitting materials and metallic electrodes are very sensitive to water and oxygen in the environment. When the sealing is poor, the luminance of devices may be reduced, the driving voltage may be raised, and black dots and short circuits may occur. Therefore, the packaging process requires a very strict standard for preventing water and oxygen from penetrating into the device. At present, in the packaging process of a flexible display device, the package cover and the lower substrate are adhered by pressure sensitive adhesive or twin adhesive laminators. However, the water-oxygen resistance abilities of pressure sensitive adhesive and twin adhesive laminators are poor, causing lifetime of displays to be shortened. In contrast, epoxy resin, which is provided with great electrical properties, adhesive properties, and weatherabilities, has been extensively used in electronic devices, such as electrical insulated components, laminated plates, and electronic semiconductor packages. Still, the adhesive ability of epoxy resin to flexible substrates can not be improved by adding silicon-containing coupling agent. Therefore, it is necessary to develop suitable packaging materials or protective materials for the surfaces of flexible substrates.

SUMMARY

According to one embodiment of the disclosure, a partially esterified epoxy resin is provided. The partially esterified epoxy resin comprises at least one of compound I, compound II, compound III, or compound IV, or the combinations thereof.

the compound I is represented as the following formula:

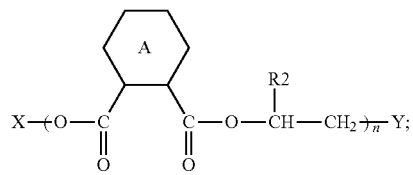

the compound II represented as the following formula:

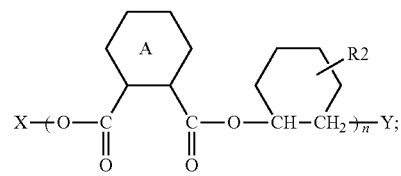

the compound III represented as the following formula:

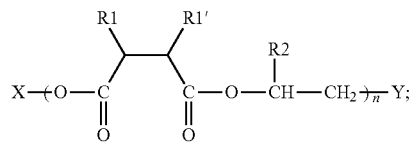

the compound IV represented as the following formula:

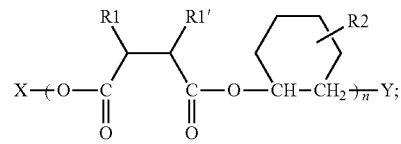

Wherein,

denotes

![structures]

"R1" and "R1'" independently denote hydrogen atom or alkyl with 1~16 carbon atoms, one or two nonadjacent of —$CH_2$— groups thereof being replaced by at least one of oxygen atom, vinylene, carbonyl, carboxyl, cyclohexyl, or phenyl;

"R2" denotes

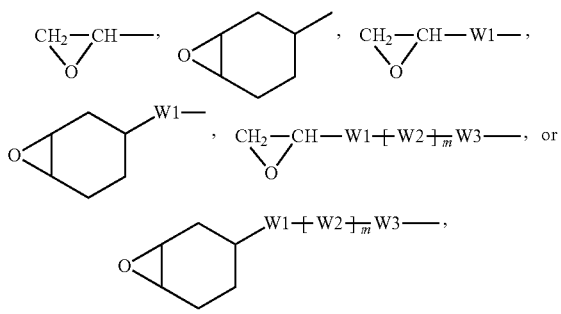

wherein "W1", "W2", and "W3" independently denote alkyl with 1~16 carbon atoms, one or two nonadjacent of —CH$_2$— groups thereof being replaced by at least one of oxygen atom, vinylene, carbonyl, carboxyl, cyclohexyl, or phenyl, m is a positive integer being larger than 1;

"X" and "Y'" independently denote hydrogen atom; and n is a positive integer being equal to or larger than 1.

According to another embodiment of the disclosure, a partially esterified epoxy resin composition is provided. The partially esterified epoxy resin composition comprises the partially esterified epoxy resin as aforementioned and a curing agent.

According to an alternative embodiment, a method of preparing a partially esterified epoxy resin composition is provided. The method comprises the following steps. A bifunctional epoxy resin and an anhydride are mixed and heated, wherein the number of equivalent moles of the bifunctional epoxy resin is greater than the number of equivalent moles of the anhydride, to form the partially esterified epoxy resin as aforementioned. A curing agent is mixed into the partially esterified epoxy resin to form a mixed solution. The mixed solution is cured to form the partially esterified epoxy resin composition.

BRIEF DESCRIPTION OF THE DRAWINGS

FIG. 1 shows a partially esterified epoxy resin composition formed between two flexible substrates according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The disclosure is directed to a partially esterified epoxy resin and a partially esterified epoxy resin composition applied with the same, and a method for preparing the partially esterified epoxy resin composition.

According to an embodiment of the disclosure, a partially esterified epoxy resin is provided.

In one embodiment, the partially esterified epoxy resin comprises at least one of compound I, compound II, compound III, or compound IV, or the combinations thereof. Compound I, compound II, compound III, and compound IV are represented as the following formula I, formula II, formula III, and formula IV, respectively.

the compound I is represented as the following formula I;

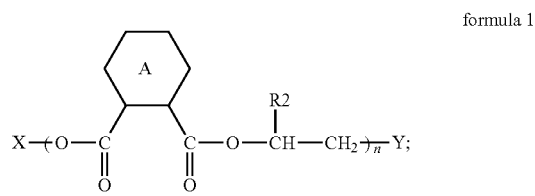

formula I the compound II represented as the following formula II;

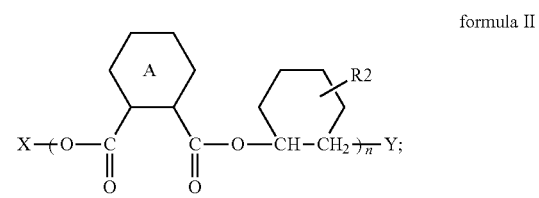

formula II the compound III represented as the following formula III;

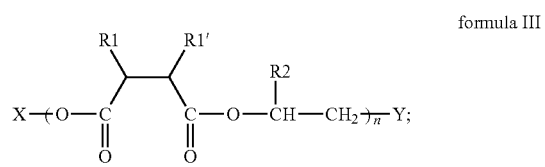

formula III the compound IV represented as the following formula IV:

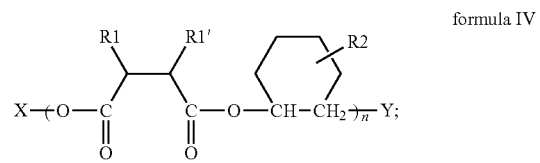

formula IV

Wherein,

denotes

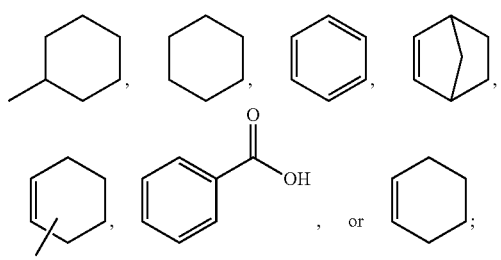

"R1" and "R1'" independently denote hydrogen atom or alkyl with 1~16 carbon atoms, one or two nonadjacent of —CH$_2$— groups thereof being replaced by at least one of oxygen atom, vinylene, carbonyl, carboxyl, cyclohexyl, or phenyl;

"R2" denotes

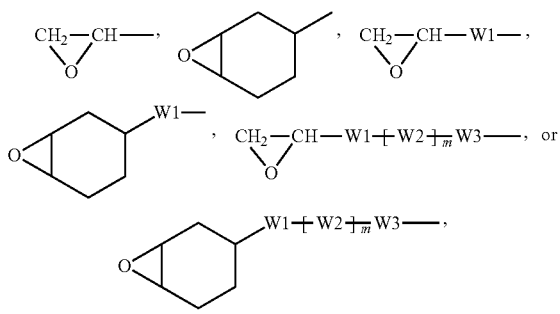

wherein "W1", "W2", and "W3" independently denote alkyl with 1~16 carbon atoms, one or two nonadjacent of —CH$_2$— groups thereof being replaced by at least one of oxygen atom, vinylene, carbonyl, carboxyl, cyclohexyl, or phenyl, m is a positive integer being larger than 1;

"X" and "Y"' independently denote hydrogen atom; and n is a positive integer being equal to or larger than 1.

In one embodiment, "R2" denotes

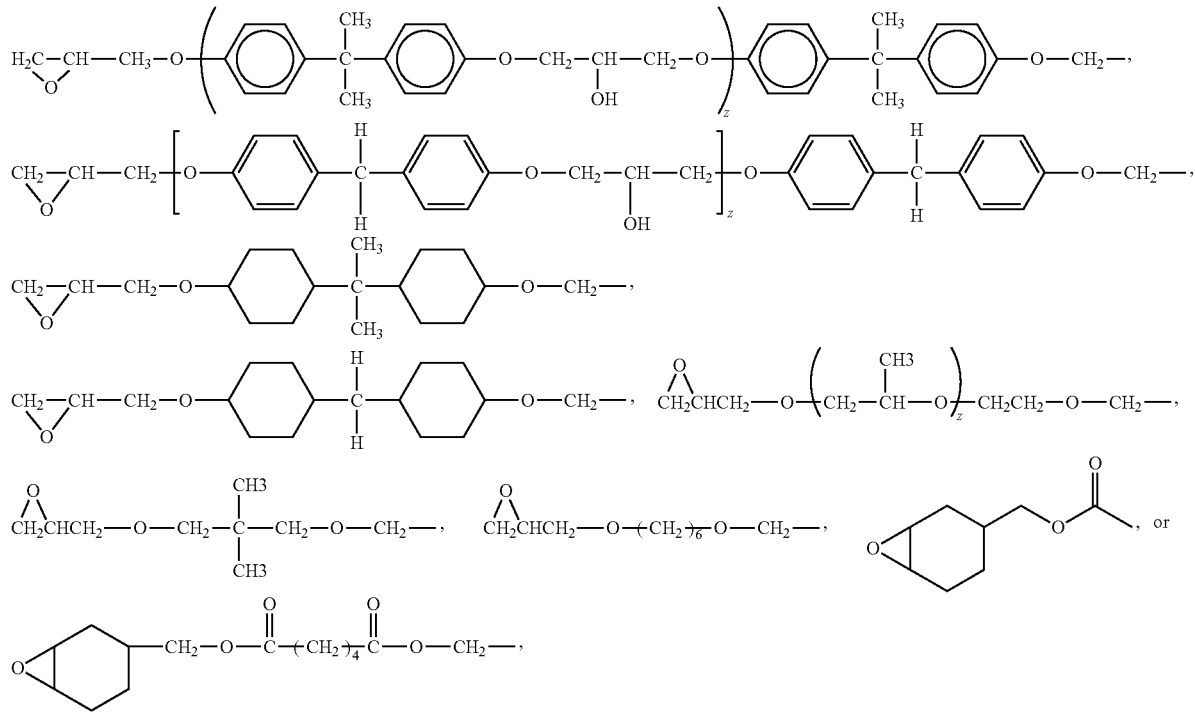

and z is a positive integer being equal to or larger than 1.

In the embodiment, the partially esterified epoxy resin, comprising at least one of compound I, compound II, compound III, or compound IV, or the combinations thereof, is provided with improved adhesive abilities. In addition, epoxy functional groups remain on the molecular chain end of the partially esterified epoxy resin, such as the epoxy functional groups in functional group R2 of compounds I-IV, such that the partially esterified epoxy resin can react with suitable curing agents for forming a cured composition.

In one embodiment, the partially esterified epoxy resin further comprises a bifunctional epoxy resin. The bifunctional epoxy resin is such as in form of a diluting agent in the partially esterified epoxy resin.

In one embodiment, the bifunctional epoxy resin comprises, such as, at least one of

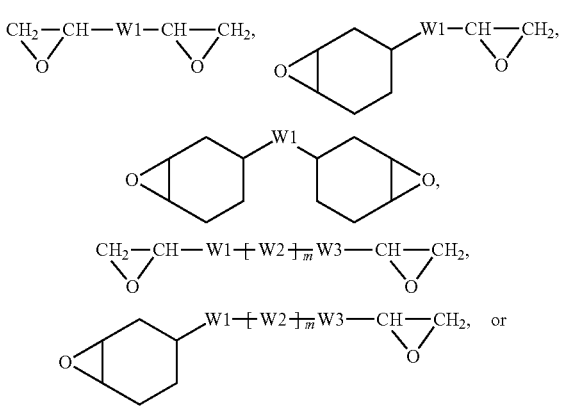

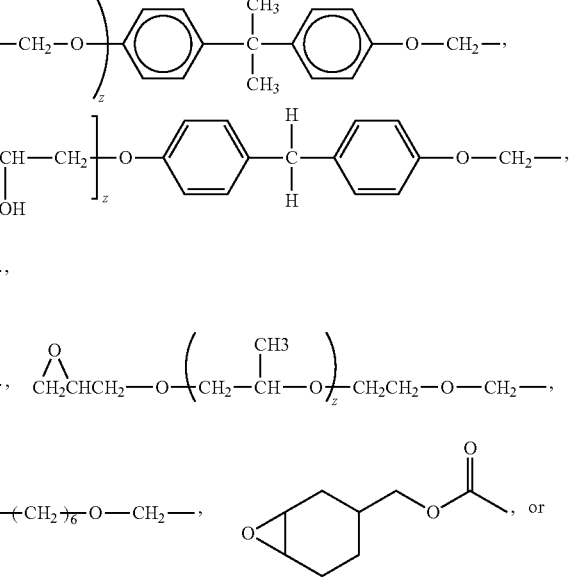

-continued

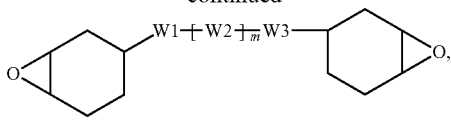

or the combinations thereof. The descriptions of "W1", "W2", and "W3" are as aforementioned.

In one embodiment, the bifunctional epoxy resin comprises at least one of bisphenol A epoxy resin, bisphenol A epoxy resin derivative, hydrogenated bisphenol A epoxy resin, hydrogenated bisphenol A epoxy resin derivative, bisphenol F epoxy resin, bisphenol F epoxy resin derivative, hydrogenated bisphenol F epoxy resin, hydrogenated bisphenol F epoxy resin derivative, aliphatic epoxy resin, or alicyclic epoxy resin, or the combinations thereof.

In one embodiment, the partially esterified epoxy resin is such as a reaction product of a bifunctional epoxy resin with an anhydride, and the number of equivalent moles of the bifunctional epoxy resin is greater than the number of equivalent moles of the anhydride, for forming the partially esterified epoxy resin, which comprises at least one of compound I, compound II, compound III, or compound IV, or the combinations thereof. In one embodiment, the ratio of the number of equivalent moles of the bifunctional epoxy resin to the number of equivalent moles of the anhydride is 1:0.1-1:0.49. In the embodiment, the types of the bifunctional epoxy resin are as aforementioned.

In one embodiment, the anhydride comprises such as at least one of methylhexahydrophthalic anhydride, hexahydrophthalic anhydride, nadic methyl anhydride, trimellitic Anhydride, dodecenyl succinic anhydride, phthalic anhydride, tetrahydrophthalic anhydride, or methyl tetrahydrophthalic anhydride, or the combinations thereof.

According to the embodiments of the disclosure, a partially esterified epoxy resin composition is provided.

In one embodiment, the partially esterified epoxy resin comprises the aforementioned partially esterified epoxy resin and a curing agent. The partially esterified epoxy resin comprises at least one of compound I, compound II, compound III, or compound IV, or the combinations thereof.

In one embodiment, the curing agent is such as a thermal-curing agent or a cationic initiator. In the embodiment, the thermal-curing agent is such as diazo epoxide, diazo epoxide derivative, polyamine, polyamine derivative, tertiary amine, tertiary amine derivative, boron amine trifluoride complex, thiol compound, or thiol compound derivative. In the embodiment, the cationic initiator is such as diaryl iodine compound or triaryl iodine compound.

In one embodiment, the partially esterified epoxy resin composition can further comprise a filler. In the embodiment, the filler is such as an inorganic material. For example, the filler comprises at least one of silicon dioxide, talc, aluminum oxide, or clay, or the combinations thereof.

In one embodiment, the partially esterified epoxy resin composition can further comprise an additive agent. In the embodiment, the additive agent can be at least one of an antifoaming agent or a leveling agent.

In the embodiment, the partially esterified epoxy resin, comprising at least one of compound I, compound II, compound III, or compound IV, or the combinations thereof, is provided with improved adhesive abilities to flexible substrates. In addition, epoxy functional groups remain on the molecular chain end of the partially esterified epoxy resin, such as the epoxy functional groups in functional group R2 of compounds I-IV, such that the partially esterified epoxy resin can react with suitable curing agents for forming a cured composition. For example, the partially esterified epoxy resin reacting with a thermal-curing agent can form a thermal-curing partially esterified epoxy resin composition, and the partially esterified epoxy resin reacting with a photo-curing agent (e.g. cationic initiator) can form a photo-curing partially esterified epoxy resin composition. Accordingly, a thermal-curing and/or a photo-curing partially esterified epoxy resin formed of the partially esterified epoxy resin can provide excellent adhesive abilities to flexible substrates, and hence being able to serve as packaging materials or protective films.

According to the embodiments of the disclosure, a method of preparing a partially esterified epoxy resin composition is provided.

In one embodiment, the method of preparing a partially esterified epoxy resin composition comprises the following steps. A bifunctional epoxy resin and an anhydride are mixed and heated, wherein the number of equivalent moles of the bifunctional epoxy resin is greater than the number of equivalent moles of the anhydride, to form a partially esterified epoxy resin. Next, a curing agent is mixed into the partially esterified epoxy resin to form a mixed solution, and the mixed solution is cured to form the partially esterified epoxy resin composition. In the embodiment, the partially esterified epoxy resin at least one of compound I, compound II, compound III, or compound IV, or the combinations thereof, wherein compound I, compound II, compound III, and compound IV are represented as the aforementioned formula I, formula II, formula III, and formula IV, respectively.

In the embodiment, the bifunctional epoxy resin is in excess in the reaction, such that epoxy functional groups can remain on the molecular chain end of the as-formed partially esterified epoxy resin, and hence the reactivity of the epoxy resin remains. A portion of the bifunctional epoxy resin reacts with the anhydride for forming such as compound I, compound II, compound III, or compound IV. The left portion of the bifunctional epoxy resin, which does not react with the anhydride, remains in the partially esterified epoxy resin in the form of a diluting agent.

In the embodiment, the types of the curing agent are as described above. In one embodiment, when a thermal-curing agent is adopted, the mixed solution is heated to be cured for forming a thermal-curing partially esterified epoxy resin composition. In another embodiment, when a photo-curing agent, such as a cationic initiator, is adopted, the mixed solution is irradiated with UV light, a photo-curing partially esterified epoxy resin composition is formed.

In one embodiment, before the mixed solution is cured to form the partially esterified epoxy resin composition, at least one of a filler, an antifoaming agent, or a leveling agent can further be mixed into the partially esterified expoxy resin to form the mixed solution. In the embodiment, the types of the filler are as aforementioned. Next, the mixed solution is cured to form the partially esterified epoxy resin composition.

Further explanation is provided with the following examples. Experimental conditions and results are listed for showing the properties of the partially esterified epoxy resin composition prepared according to the embodiments of the disclosure. However, the following examples are for purposes of describing particular embodiments only, and are not intended to be limiting.

I. First, a partially esterified epoxy resin is prepared. The method of preparing the resin is as follows:

A liquid bifunctional epoxy resin mixed with an anhydride, followed by the addition of a catalyst, is then placed in an oil-bath under 120° C. for 30-60 minutes for forming a partially esterified epoxy resin. In the present embodiment, triethanolamine is selected to be the catalyst, however, the selections of a catalyst depend on actually applications and are not limited thereto.

The epoxy resin and the anhydride selected for preparing the partially esterified epoxy resins and the reaction conditions thereof are as shown in Table 1. The epoxy resins selected for preparing the partially esterified epoxy resins HY-E1-A1 and HY-E1-A2 is epoxy resin HY-E1, selected for preparing the partially esterified epoxy resins HY-E2-B1, HY-E2-B2 and HY-E2-B3 is epoxy resin HY-E2, selected for preparing the partially esterified epoxy resin Cyclo-E-M is epoxy resin Cyclo-E, and selected for preparing the partially esterified epoxy resins EP-C1 and EP-C2 is epoxy resin EP. The descriptions of the above-mentioned epoxy resins are as follows:

(1) HY-E1: epoxidized hydrogenated bisphenol A, obtained from CVC Thermoset Specialties (trade name: EPALLOY™5001).

(2) HY-E2: epoxidized hydrogenated bisphenol A, obtained from CVC Thermoset Specialties (trade name: EPALLOY™5000).

(3) Cyclo-E: 3,4-epoxycyclohexanemethyl-3,4-epoxy-cyclohexane carboxylate, obtained from Mitisui Toatsu Chemical Inc (trade name: K126).

(4) EP: bisphenol A epoxy resin, obtained from Shell Chemical (trade name: EPON 828).

is then removed, such as by placing the substrate with the coated composition into an oven. Meanwhile, the thickness of the partially esterified epoxy resin composition coating 120 is about 25 μm. After that, the coating 120 is assembled to another flexible substrate 130 at room temperature, such as by pressing the coating 120 and the substrate 130 together by a pressing machine. As such, a sample film 100 as shown in FIG. 1 is formed. If the composition is added with a cationic initiator, the sample film is then irradiated with UV light of 365 nm (energy condition: 2000 mJ/cm$^2$) to be cured. On the other hand, if the composition is added with a thermal-curing agent, the sample is placed into an oven at 110° C. for 2 hours. At last, the cured sample film is cut into pieces, each with a size of 2.5 cm*8 cm. A peel strength test is performed on the cut sample film with a two-legged tension machine (QC Teck), and the stretching rate is 254 mm/min (ASTM 1876-01 T-Peel Test).

TABLE 1

| Partially esterified epoxy resin | Bifunctional epoxy resin/ Weight (g) | Anhydride/ Weight (g) | Bifunctional epoxy resin:Anhydride (equivalent molar ratio) | Reaction condition |
|---|---|---|---|---|
| HY-E1-A1 | Hydrogenated epoxy resin/100 g | Methylhexahydrophthalic anhydride/ 16 g | 1:0.19 | 120° C./30 minutes |
| HY-E1-A2 | Hydrogenated epoxy resin/100 g | Methylhexahydrophthalic anhydride/ 24 g | 1:0.28 | 120° C./30 minutes |
| HY-E2-B1 | Hydrogenated epoxy resin/100 g | Methylhexahydrophthalic anhydride/ 16 g | 1:0.21 | 120° C./60 minutes |
| HY-E2-B2 | Hydrogenated epoxy resin/100 g | Hexahydrophthalic anhydride/ 24 g | 1:0.34 | 120° C./60 minutes |
| HY-E2-B3 | Hydrogenated epoxy resin/100 g | Methylhexahydrophthalic anhydride/ 32 g | 1:0.41 | 120° C./60 minutes |
| Cyclo-E-M | Hydrogenated cycloalkyl epoxy resin/ 100 g | Methylhexahydrophthalic anhydride/ 16 g | 1:0.13 | 120° C./30 minutes |
| EP-C1 | Hydrogenated epoxy resin/100 g | Methylhexahydrophthalic anhydride/ 16 g | 1:0.18 | 120° C./60 minutes |
| EP-C2 | Hydrogenated epoxy resin/100 g | Methylhexahydrophthalic anhydride/ 24 g | 1:0.27 | 120° C./60 minutes |

II. Next, partially esterified epoxy resin compositions of examples 1-7 are prepared. The method of preparing the resin compositions is as follows:

The above-mentioned partially esterified epoxy resin, an inorganic filler, and a curing agent, which may be a thermal-curing agent or a cationic initiator, are mixed at room temperature, followed the addition of an organic solvent for forming a mixed solution of a partially esterified epoxy resin composition. Next, the viscosity of the mixed solution is adjusted to be about 1000 cps with the organic solvent (or a different organic solvent), followed by de-aeration by a de-aerating device.

Next, referring to FIG. 1, FIG. 1 shows a schematic diagram of a partially esterified epoxy resin composition formed between two flexible substrates according to an embodiment of the disclosure. After the mixed solution of the partially esterified epoxy resin composition is coated on the flexible substrate 110, such as by a blade coating method, the solvent In the present embodiment, fumed silica is selected for the inorganic filler, Chivacure®1176 (trade name; chemical composition: diphenyl(4-phenylthio)phenylsulfonium hexafloroatimonate and (thiodi-4,1-phenylene)bis(diphenylsulfonium) dihexafluoroatimonate, 50% in propylene carbonate) is selected for the cationic initiator, boron ethylamine trifluoride is selected for the thermal-curing agent, propylene glycol mono-methyl ether acetate is selected for the organic solvent, and the flexible substrates 110 and 130 are independently one of polyimide (PI), polyethylene terephthalate (PET), or polyethylene naphthalate (PEN). However, the selections of the inorganic filler, the cationic initiator, the thermal-curing agent, the organic solvent, and the flexible substrates 110 and 130 depend on actual conditions and are not limited thereto. The reaction conditions and the results of peeling strength tests of examples 1-7 are as shown in Table 2.

TABLE 2

(numbers shown in Table 2 indicate the weight parts of ingredients in the compositions in examples 1-7)

| | Example 1 | Example 2 | Example 3 | Example 4 | Example 5 | Example 6 | Example 7 |
|---|---|---|---|---|---|---|---|
| Hy-E1-A1 | 40 | 50 | | | | 30 | |
| Hy-E1-A2 | | | 50 | | 40 | | |
| Hy-E2-B1 | 60 | | | 70 | | | |
| Hy-E2-B2 | | 50 | | | | | |
| Hy-E2-B3 | | | 40 | | | | |
| Cyclo-E-M | | | 10 | 30 | | | 50 |
| EP-C1 | | | | | 60 | | |
| EP-C2 | | | | | | 70 | 50 |
| Inorganic filler | 2 | 2 | 2 | 2 | 2 | 2 | 2 |
| Cationic initiator | 6 | | 6 | 6 | 6 | | 6 |
| Thermal-curing agent | | 1 | | | | 1 | |
| Results of peeling strength test (Unit: kgf) | | | | | | | |
| Flexible substrates | | | | | | | |
| PET vs. PET | 3.8 | 4.8 | 4.0 | 3.5 | 3.9 | 4.4 | 3.2 |
| PET vs. PEN | 2.7 | 3.0 | 2.6 | 2.8 | 2.4 | 2.5 | 2.2 |
| PI vs. PI | 2.1 | 1.7 | 1.9 | 2.2 | 1.6 | 1.5 | 1.6 |
| PEN vs. PEN | — | 2.4 | — | — | — | 2.6 | — |

In comparative examples 1-4, the epoxy resin compositions are prepared from non-esterified epoxy resins, wherein the anhydride is added in the process of preparing the epoxy resin composition, the reaction temperature of which is relative low, and hence partially esterified epoxy resin is not formed in the reaction process. For example, in comparative examples 1-4, an anhydride is added into the epoxy resin mixing together with other additives, and the epoxy resin is thermally cured to form an epoxy resin composition film; however, the reaction temperature for the thermal-curing processes (for example, 110° C.) is lower than the reaction temperature for preparing the partially esterified epoxy resin (for example, 120° C.). Except for the process of the addition of an anhydride, other steps or processes of the preparation methods for comparative examples 1-4 are the same with those of the preparation methods for examples 1-7. The reaction conditions and the results of peeling strength tests of comparative examples 1-4 are as shown in Table 3.

TABLE 3

(numbers shown in Table 3 indicate the weight parts of ingredients in compositions in comparative examples 1-4)

| | Comparative Example 1 | Comparative Example 2 | Comparative Example 3 | Comparative Example 4 |
|---|---|---|---|---|
| Epoxy resin | | | | |
| Hy-E1 | 50 | | 40 | |
| Hy-E2 | 50 | 60 | | |
| Cyclo-E | | 30 | | 50 |
| EP | | 10 | 60 | 50 |
| Anhydride | | | | |
| Methylhexahydro-phthalic anhydride | 8 | 16 | 20.8 | 16 |
| Hexahydrophthalic anhydride | 12 | — | — | — |
| Inorganic filler | 2 | 2 | 2 | 2 |
| Cationic initiator | 6 | | 6 | 6 |
| Thermal-curing agent | | 1 | | |
| Results of peeling strength test (Unit: kgf) | | | | |
| Flexible substrates | | | | |
| PET vs. PET | 0.8 | 1.0 | 0.6 | 0.5 |
| PET vs. PEN | 0.6 | 0.8 | 0.7 | 0.6 |
| PI vs. PI | 0.05 | 0.08 | 0.06 | 0.04 |
| PEN vs. PEN | — | 0.9 | — | — |

As shown in Tables 2-3, the bifunctional epoxy resin in excess is partially esterified by reaction with limited amount of the anhydride, the aforementioned partially esterified epoxy resin comprising at least one of compound I, compound II, compound III, or compound IV, or the combinations thereof is formed, and hence adhesive abilities of epoxy resin to flexible substrates are improved. For example, referring to the results of peeling strength tests in Tables 2-3, among the adhesive abilities between substrates PET vs. PET, the peeling strength of comparative examples 1-4 are about 0.5-1.0 kgf, and the peeling strength of examples 1-7 are about 3.2-4.8 kgf. With the partially esterified epoxy resin, the adhesive abilities are improved by more than 5 times. In addition, the adhesive abilities between substrates PET vs. PEN are improved by more than 3 times, the adhesive abilities between substrates PI vs. PI are improved by more than 30 times, and the adhesive abilities between substrates PEN vs. PEN are improved by more than 2 times.

Therefore, partially esterified epoxy resin composition applied between flexible substrates can provide an improved adhesive ability therebetween. Such improvement of adhesive abilities is even more remarkable for flexible substrates, such as PI, PET, and PEN.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A partially esterified epoxy resin, comprising:
compound IV,
the compound IV represented as the following formula:

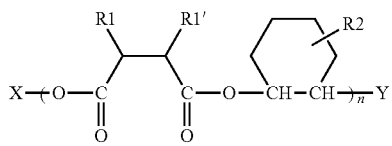

Wherein
"R1" and "R1'" independently denote alkyl with 1~16 carbon atoms, one or two nonadjacent of —CH$_2$— groups thereof being replaced by at least one of oxygen atom, vinylene, carbonyl, carboxyl, cyclohexyl, or phenyl;
"R2" denotes

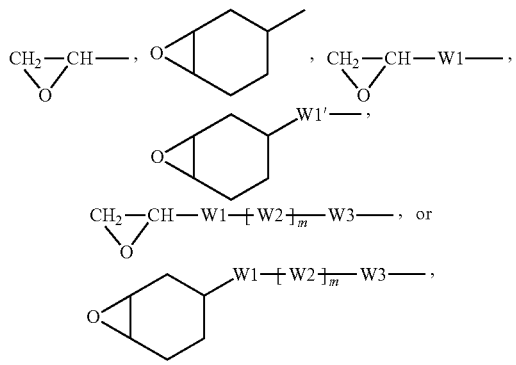

wherein "W1", "W2", and "W3" independently denote alkyl with 1~16 carbon atoms, one or two nonadjacent of —CH$_2$— groups thereof being replaced by at least one of oxygen atom, vinylene, carbonyl, carboxyl, cyclohexyl, or phenyl, m is a positive integer being larger than 1, and "W1'" denotes alkyl with 1~16 carbon atoms, one or two nonadjacent of —CH$_2$— groups thereof being replaced by at least one of oxygen atom, vinylene, carbonyl, cyclohexyl, or phenyl;
"X" and "Y" independently denote hydrogen atom; and
n is a positive integer being equal to or larger than 1.

2. The partially esterified epoxy resin according to claim 1, wherein "R2" denotes

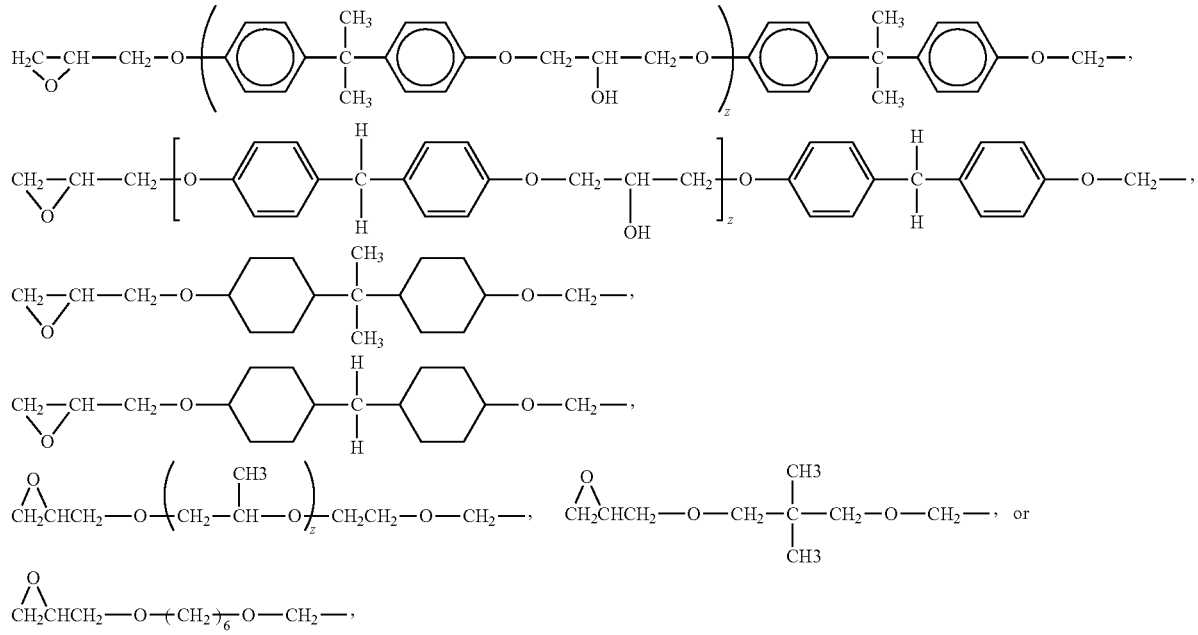

wherein z is a positive integer being equal to or larger than 1.

3. The partially esterified epoxy resin according to claim 1, further comprising a bifunctional epoxy resin in a form of a diluting agent in the partially esterified epoxy resin.

4. The partially esterified epoxy resin according to claim 3, wherein the bifunctional epoxy resin comprises at least one of bisphenol A epoxy resin, bisphenol A epoxy resin derivative, hydrogenated bisphenol A epoxy resin, hydrogenated bisphenol A epoxy resin derivative, bisphenol F epoxy resin, bisphenol F epoxy resin derivative, hydrogenated bisphenol F epoxy resin, hydrogenated bisphenol F epoxy resin derivative, aliphatic epoxy resin, or alicyclic epoxy resin, or the combinations thereof.

5. The partially esterified epoxy resin according to claim 1, wherein the partially esterified epoxy resin is a reaction product of a bifunctional epoxy resin with an anhydride, and the ratio of the number of equivalent moles of the bifunctional epoxy resin to the number of equivalent moles of the anhydride is 1:0.1-1:0.49.

6. The partially esterified epoxy resin according to claim 1, further comprising at least one of compound I, compound II, or compound III, the compound I represented as the following formula:

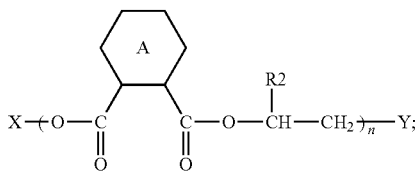

the compound II represented as the following formula:

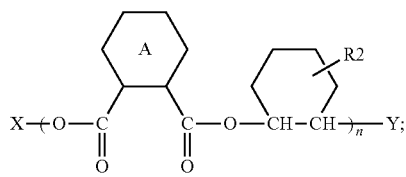

and
the compound III represented as the following formula:

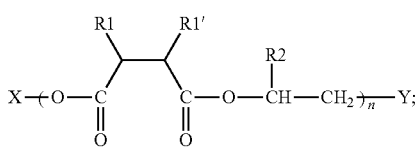

Wherein

denotes

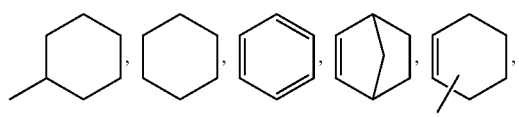

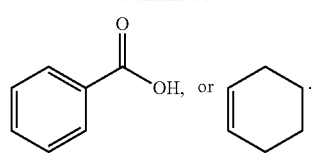

7. A partially esterified epoxy resin composition, comprising:
 a partially esterified epoxy resin composition, comprising compound IV,
 the compound IV represented as the following formula:

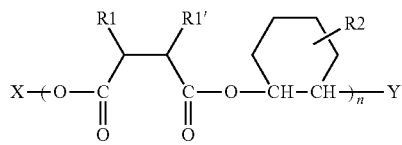

Wherein
 "R1" and "R1'" independently denote alkyl with 1~16 carbon atoms, one or two nonadjacent of —$CH_2$— groups thereof being replaced by at least one of oxygen atom, vinylene, carbonyl, carboxyl, cyclohexyl, or phenyl;
 "R2" denotes

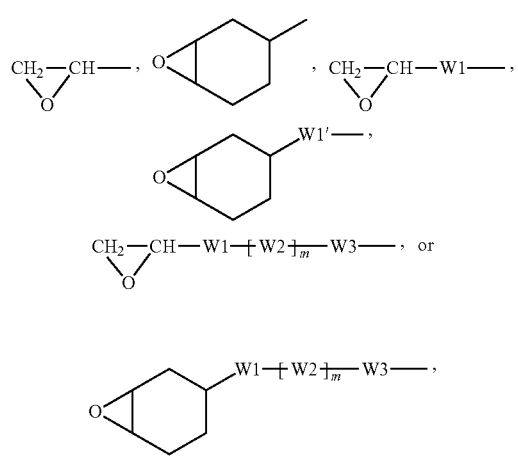

wherein "W1", "W2", and "W3" independently denote alkyl with 1~16 carbon atoms, one or two nonadjacent of —$CH_2$— groups thereof being replaced by at least one of oxygen atom, vinylene, carbonyl, carboxyl, cyclohexyl, or phenyl, m is a positive integer being larger than 1, and "W1'" denotes alkyl with 1~16 carbon atoms, one or two nonadjacent of —$CH_2$— groups thereof being replaced by at least one of oxygen atom, vinylene, carbonyl, cyclohexyl, or phenyl;
 "X" and "Y" independently denote hydrogen atom; and
 n is a positive integer being equal to or larger than 1; and
 a curing agent.

8. The partially esterified epoxy resin composition according to claim 7, wherein "R2" denotes

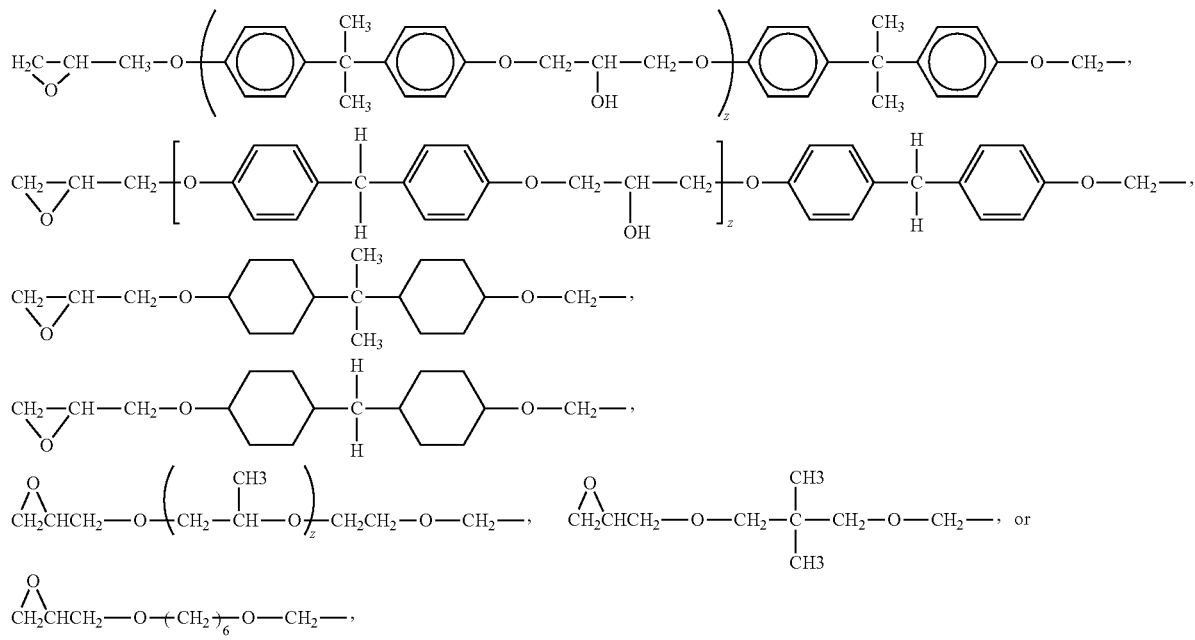

wherein z is a positive integer being equal to or larger than 1.

9. The partially esterified epoxy resin composition according to claim 7, further comprising a bifunctional epoxy resin.

10. The partially esterified epoxy resin composition according to claim 9, wherein the bifunctional epoxy resin comprises at least one of bisphenol A epoxy resin, bisphenol A epoxy resin derivative, hydrogenated bisphenol A epoxy resin, hydrogenated bisphenol A epoxy resin derivative, bisphenol F epoxy resin, bisphenol F epoxy resin derivative, hydrogenated bisphenol F epoxy resin, hydrogenated bisphenol F epoxy resin derivative, aliphatic epoxy resin, or alicyclic epoxy resin, or the combinations thereof.

11. The partially esterified epoxy resin composition according to claim 7, wherein the partially esterified epoxy resin is a reaction product of a bifunctional epoxy resin with an anhydride, and the ratio of the number of equivalent moles of the bifunctional epoxy resin to the number of equivalent moles of the anhydride is 1:0.1-1:0.49.

12. The partially esterified epoxy resin composition according to claim 7, wherein the curing agent is a thermal-curing agent or a cationic initiator.

13. The partially esterified epoxy resin composition according to claim 12, wherein the cationic initiator is diaryl iodine compound or triaryl iodine compound.

14. The partially esterified epoxy resin composition according to claim 12, wherein the thermal-curing agent is diazo epoxide, diazo epoxide derivative, polyamine, polyamine derivative, tertiary amine, tertiary amine derivative, boron amine trifluoride complex, thiol compound, or thiol compound derivative.

15. The partially esterified epoxy resin composition according to claim 7, further comprising at least one of a filler, an antifoaming agent, or a leveling agent, wherein the filler comprises at least one of silicon dioxide, talc, aluminum oxide, or clay, or the combinations thereof.

16. The partially esterified epoxy resin composition according to claim 7, further comprising at least one of compound I, compound II, or compound III, the compound I represented as the following formula:

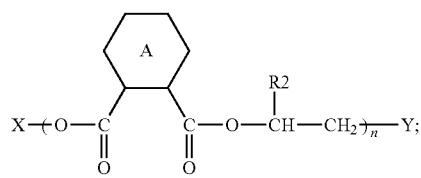

the compound II represented as the following formula:

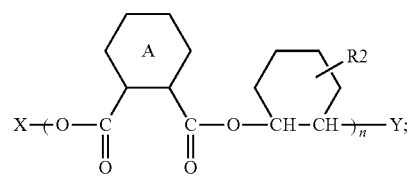

and the compound III represented as the following formula:

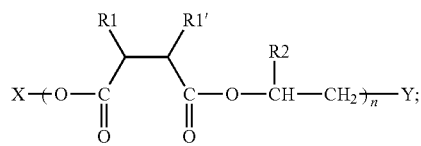

Wherein
denotes
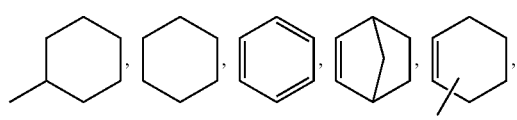
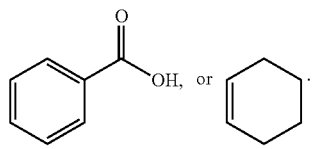
* * * * *